US 6,688,116 B1

(12) United States Patent  
Schneider et al.

(10) Patent No.: US 6,688,116 B1
(45) Date of Patent: Feb. 10, 2004

(54) REFRIGERATOR ELECTRON BEAM ION TRAP-SOURCE

(75) Inventors: Dieter H. G. Schneider, Livermore, CA (US); Joseph W. McDonald, Livermore, CA (US)

(73) Assignee: Physics & Technology, LLC, Livermore, CA (US)

( * ) Notice: Subject to any disclaimer, the term of this patent is extended or adjusted under 35 U.S.C. 154(b) by 0 days.

(21) Appl. No.: 10/327,272

(22) Filed: Dec. 20, 2002

(51) Int. Cl.[7] .......................... B01D 8/00; F25B 19/00; F25B 9/00; F25D 23/12; H01J 23/00
(52) U.S. Cl. .................. 62/55.5; 62/51.1; 62/259.2; 62/6; 315/500
(58) Field of Search ................. 62/259.2, 51.1, 62/55.5, 6; 315/500

(56) References Cited

U.S. PATENT DOCUMENTS

| | | | | |
|---|---|---|---|---|
| 3,999,403 A | * | 12/1976 | Bower et al. | 62/51.2 |
| 4,600,802 A | * | 7/1986 | Ihas et al. | 174/15.4 |
| 5,045,703 A | * | 9/1991 | Wieboldt et al. | 250/352 |
| 5,590,538 A | * | 1/1997 | Hsu et al. | 62/51.2 |
| 5,742,217 A | * | 4/1998 | Bent et al. | 335/216 |
| 5,743,410 A | * | 4/1998 | Stadtmuller | 209/213 |
| 6,060,833 A | * | 5/2000 | Velazco | 315/5.41 |

OTHER PUBLICATIONS

Rev. Scl. Instrum, *Electron beam ion sources and their development at JINR (invited)*; E.D. Donets, vol. 61 (1); Jan. 1990, 225–229.

Physical Review A; *Ion–collision experiments with slow, very highly charged ions extracted from an electron–beam ion trap*; D. Schneider et al.; vol. 42, No. 7; Oct. 1, 1990; 3889–3895.

Physical Review A; *Production of high–charge–state thorium and uranium ions in an electron–beam ion trap*; D. Schneider et al.; vol. 44, No. 5; Sep. 1, 1991; 3119–3124.

Physics & Technology web site brochure posting 3/02; REBIT/S Refrigerated Electron Beam Ion Trap/Source.

* cited by examiner

*Primary Examiner*—William C. Doerrler
(74) *Attorney, Agent, or Firm*—Knobbe, Martens, Olson & Bear, LLP

(57) ABSTRACT

An ion beam producing device employing a refrigeration system to provide the cooling for a superconducting compression magnet at a trap core of an electron beam ion trap (EBIT) without the use of cryogenic liquid gases. The elimination of cryogenic cooling gases, such as liquid helium, is effectuated by the incorporation of cryo-refrigerators having highly thermally conductive cryo-heads, and a super-conducting, solid lead arrangement for energizing the compression magnet, the leads producing little or no heat within the cold shield. The reduction or elimination of use of liquid cooling-gases significantly reduces the size and operating cost of the electron beam source/trap system. A magnetic field line guide-field reduces magnet field-line interference otherwise risked by the reduction in size of the electron beam device.

34 Claims, 2 Drawing Sheets

US 6,688,116 B1

REFRIGERATOR ELECTRON BEAM ION TRAP-SOURCE

FIELD OF THE INVENTION

The invention relates generally to electron beam ion sources (EBIS), and particularly to an apparatus including a refrigerated electron beam ion trap (EBIT) system which preferably reduces reliance on liquid gases for cooling.

BACKGROUND OF THE INVENTION

An electron beam ion trap (EBIT) is a spin-off development of an electron beam ion source (EBIS). The basic physical principle behind EBIT or EBIS is the trapping of low charge state ions in the space charge potential of the compressed electron beam and the subsequent successive ionization, which produces very highly charged ions depending in range on the electron beam ionization energy. The electron beam is compressed in a coaxial magnetic field (~3 Tesla) of a super-conducting magnet. The first operational EBIS was demonstrated in 1967, and the operation of an EBIT as a source was first reported in 1990. In these prior devices, the extracted ion species and charges range from $H^+$ to $Th^{80+}$ with energies variable between 2 keV to 30 keV per charge. A description of prior electron beam ion sources incorporating an ion trap may be found in Schneider et al., "Ion collision experiments with slow, very highly charged ions extracted from an electron-beam ion trap" Phys. Rev. A 42, 3889 (1990), which is incorporated herein by reference for this purpose.

Generally, prior art electron beam ion traps and sources require liquid, cryogenic cooling gases (typically helium and nitrogen) to maintain operational conditions. In these prior art sources and traps, a liquid nitrogen vessel forms the outer cold shield that cools the interior of the vacuum vessel from ambient temperature to prevent significant cook-off of liquid helium. Additionally an inner, liquid helium-filled vessel surrounds the ultra-high vacuum trap core including superconducting compression magnets. The prohibitive cost of liquid helium is a driving factor in reducing the range of application of such sources of highly charged ions.

SUMMARY OF THE INVENTION

In accordance with a preferred embodiment, an electron beam device is provided for producing ions. The device includes an electron beam source configured to produce an electron beam and a trap core inline with the electron beam. A compression magnet is located in the trap core and is configured to compress the electron beam and a first cooling contact in thermal communication with the trap core. A refrigerator system is provided which cools the trap core by cooling the cooling contact, with a first thermally conductive, solid link located between the first cooling contact and the refrigerator system. The device also includes a collection magnet inline with the electron beam, the collection magnet being located downstream of the compression magnet. An outer cold shield substantially surrounds the electron beam source, trap core, and collection magnet.

In accordance with another preferred embodiment, a refrigeration system for maintaining cryogenic conditions at the core of an electron beam ion trap is provided. The refrigeration system includes a cryo-refrigerator configured to cool a trap core and a cold shield that separates a substantially room-temperature trap exterior from the trap interior. In addition, a first cryo-head is in solid thermal communication with the trap core is provided, with a compression magnet being located within the trap core. A first thermally conductive solid link is also provided between the cryo-head and the cryo-refrigerator.

In accordance with yet another preferred embodiment, a method of cooling a trap core of an electron beam device for producing ions is provided. The method includes the steps of producing an electron beam and compressing the electron beam in the trap core using a compression magnet. The trap core is cooled by predominantly conductively transferring heat produced in the trap core to a first cooling contact. This heat is conducted from the cooling contacts through a first solid thermally conductive link to a first cryo-refrigerator. A resulting ion beam is then outputted.

As a result of the features described herein, preferred embodiments of the present invention are preferably capable of functioning like a typical electron beam ion trap, while at the same time offering the advantages of greatly reduced size and cost. For example, the elimination of the liquid gas based refrigeration system, especially the liquid helium cooling component of the system, reduces the operation cost of the trap-source, which is traditionally dominated by the cost of liquid helium in the prior art. As a result, new applications of electron beam ion trap-sources are made possible in a wide variety of fields, such as semi-conductor manufacturing to biomolecular fragmentation, among others. In addition, preferred embodiments of the present invention are able to operate at low electronic beam energies which, in turn, allows production of low energy ion beams.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. These and other embodiments of the present invention will become readily apparent to those skilled in the art from the following detailed description of the invention having reference to the attached figures, the invention not being limited to any particular preferred embodiment(s) disclosed.

BRIEF DESCRIPTION OF THE DRAWINGS

Other aspects, advantages and modifications will become apparent to those skilled in the art from the detailed description below having reference to the figures that follow, which are meant to illustrate and not to limit the invention, and in which.

DETAILED DESCRIPTION OF THE PREFERRED EMBODIMENT

Preferred embodiments of an electron beam ion trap-source eliminate both the outer liquid nitrogen cold shield and the inner liquid helium cold shield or, alternatively, just the inner liquid helium cold shield associated with conventional electron beam ion traps and sources. The cooling of a trap core by predominantly conductively transferring away heat produced the trap core is thereby made possible. Preferred embodiments of the present invention generally provide an electron beam device or, more specifically, a refrigerator electron beam ion trap source using a refrigeration system that links commercially available cryo-refrigeration units to the outer cold shield and the trap core using conductive cooling contacts.

The resulting elimination of liquid cooling gases significantly reduces the size of the trap-source. However, the reduction in size can result in irregularities of the magnetic field (~3 Tesla) generated by the close proximity of the super-conducting compression magnet to the collector magnet. Accordingly, preferred embodiments of the present invention address this problem through the use of a tunable electromagnetic guide-field that maintains the homogeneity, shape and continuity of the magnetic field-lines of the compression magnet and the collector magnet.

The provided refrigeration system also includes an outer cold shield that separates the trap interior from the room temperature walls of the vacuum vessel. Preferably, one cold-head connects the outer cold shield to one cryo-refrigerator, and the second cold-head connects the trap core to another cryo-refrigerator, preferably, by being in thermal communication with the compression magnets. In preferred embodiments, the cooling contacts are two cold-heads preferably further configured to have a layered construction to increase mechanical flexibility while maintaining thermal conductivity. Preferred embodiments also employ high-temperature, super-conducting leads that supply power to the magnet in the trap core with minimized heat creation interior to the outer cold shield.

Figure 1:
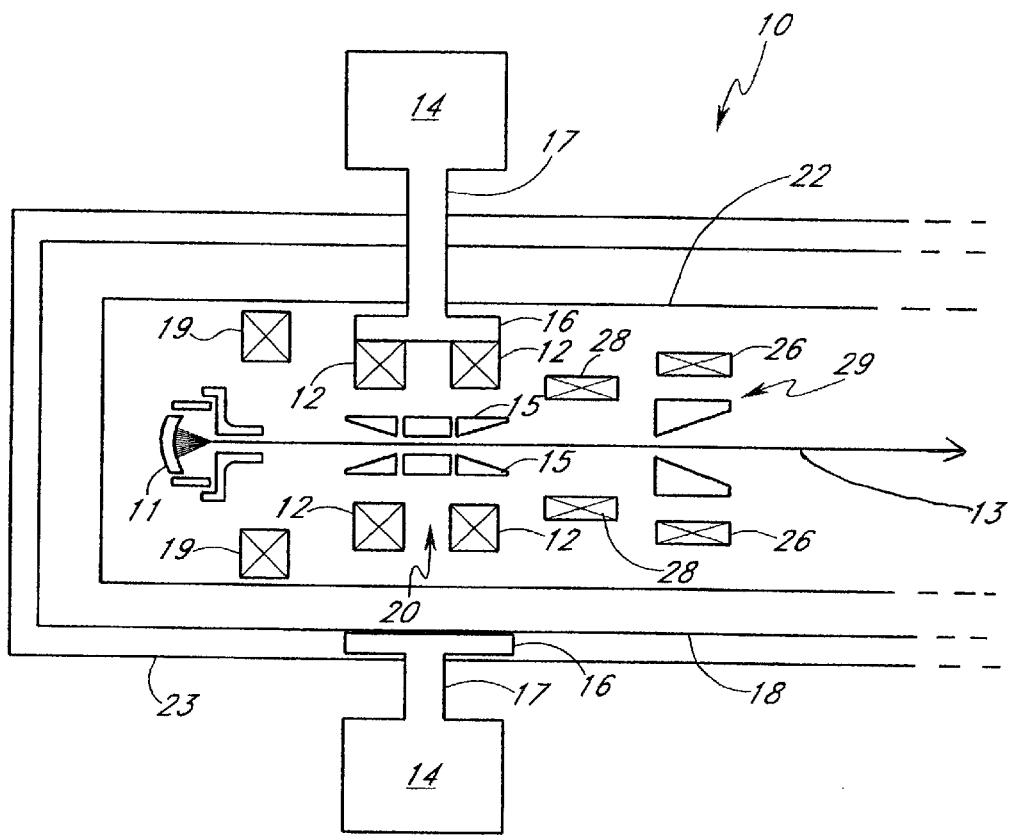
FIG. 1 is a schematic cross-section of a cryo-refrigerated electron beam ion trap showing the major components, in accordance with a preferred embodiment of the present invention.

With reference to FIG. 1, a cryo-refrigerated electron beam device 10 for producing ions is provided with an electron beam source 11, such as an electron beam gun, for producing an electron beam 13. The electron beam device 10 includes a refrigeration system 14 linked to a compression magnet 12, preferably a cold-bore super-conducting magnet. The refrigeration system 14, preferably comprising two commercially available cryo-refrigerator units located outside of vacuum vessel walls 23, cools compression magnets 12 through cooling contacts or cold-heads 16. These cold heads 16, in combination with heat load minimization, effectuate the active cooling of a trap core 20. Preferably, two compression magnets 12 are provided, each encircling the electron beam 13, with one cold-head preferably in thermal communication with both magnets 12, as shown in FIG. 1.

The trap core 20, including the compression magnets 12 and drift tubes 15, is preferably surrounded by an inner cold shield 22. The inner cold shield 22 is preferably a simple metallic barrier. The cooling of the trap core 20 is partially effectuated by using the solid, highly thermally conductive cooling contacts or cold-heads 16 in direct contact with both an outer cold shield 18 and the compression magnets 12 in the trap core 20.

The outer cold shield 18 preferably also comprises a simple metallic barrier. The cold-heads 16 are linked to the refrigerator system 14 via solid, highly thermally conductive links 17, which remove heat from both the trap core 20 and outer cold shield 18 through a solid transfer medium, such as a highly thermal conductive metal or alloy thereof, rather than a gas or liquid. The cryo-refrigerator cooled outer cold shield 18 preferably replaces the liquid nitrogen reservoir which cools the outer cold shield of typical electron beam ion trap-sources, and functions to separate the room temperature vacuum vessel outer wall 23 from the interior of the ion beam device 10. The inner liquid helium reservoir typically employed in the prior art is preferably eliminated completely by cooling the compression magnet 12 and trap core 20 directly using another solid conductive link 17 to cryo-refrigeration units 14. Thus, in place of massive, complex, and expensive outer nitrogen and inner helium reservoirs, the illustrated embodiments employ relatively less complex cryo-refrigeration units and highly thermally conductive paths among the elements to be cooled.

Preferably, the refrigeration system 14 is capable of maintaining the core 20 within the outer cold shield 18 at a temperature of about 40° K. This temperature is significantly lower than the temperature (77 K) made possible by a liquid $N_2$ cold shield. In alternate embodiments, a liquid nitrogen reservoir is used to cool the outer cold shield, while a cold-head linked to a cryo-refrigerator is used to cool the compression magnet in the trap core. Although using a liquid nitrogen reservoir to cool the outer cold shield 18 in combination with a cryo-cooled core does not offer the full extent of size reduction of the beam device, the total production cost of the beam device can be reduced.

Although the elimination of one or more cooling gas circulation systems allows a significant reduction in the size of the overall trap-source, in conventional traps the physical spacing between the collector magnet 26 and the compression magnet 12 was large enough to preclude interference between their respective magnetic fields. The reduction in size, made possible in preferred embodiments by eliminating the use of one or more cooling gas circulation systems, can cause significant discontinuity of the magnetic fields. Preferred embodiments of the present invention address magnetic field discontinuity by employing a tunable electromagnetic guide-field 28, discussed in more detail below.

In addition, a bucking coil 19 is preferably provided at the electron beam source 11, but upstream of the compression magnets 12. The vacuum vessel wall 23, having an exterior which is preferably room temperature, preferably surrounds the inner cold shield 22 thereby allowing the maintenance of a vacuum which surrounds and insulates the interior of outer cold shield 18.

With further reference to FIG. 1, preferred embodiments allow the successful integration of the refrigeration system and an electron beam ion trap/source, without sacrificing any advantages afforded by the incorporation of the cryo-refrigeration system. As previously discussed, in certain preferred embodiments, a potential problem resulting from the otherwise advantageous reduction in size of the beam device 10 is that magnetic field inhomogeneity between the compression magnet(s) 12 and the collector magnet 26, which are relatively close to one another, can distort the ion extraction from the source. The tunable electromagnetic guide-field 28 offers one solution to this problem through allowing the use of the provided electron beam device 10 with low energy electron beams 13, preferably having an ionization potential ranging from about 0.5 to about 40 keV, thereby providing a wide range in extracted ion beam energies which the beam device 10 is capable of producing, preferably ranging from about 0.5 to about 40 keV. Although the ionization potential energy range and the extraction voltage energy range are both preferably from 0.5 to about 40 keV, it should be understood that the extraction voltage of the device may be independent of the voltage at which the ions were produced, if desired. For example, the device is capable of extracting and outputting beams having energy levels ranging from 0.5 to about 40 keV multiplied by a charge of the ions extracted.

With further reference to FIG. 1, the tunable electromagnetic guide-field 28 preferably maintains the homogeneity and continuity of the magnetic field-lines between the compression magnet 12 and the collector magnet 26. The guide-field 28, preferably comprising a tunable trim magnet that encircles the electron beam 13, allowing the efficient transport of the electron beam 13 or extracted ion beam through the super-conductor compression magnets 12 and the collector magnet 26. Preferably, the super-conductor magnet has a magnetic output of 2.5 to 3.5 Tesla, more preferably about 3 Tesla. The guide-field 28 also serves to focus the electron beam 13 or extracted ion beam through the collector 29. The tuning of the guide field 28 effectuates the transport of the charged particles in beam 13 through the various apertures in the system while minimizing the extent to which the particle collide with surfaces surrounding the beam 13, thereby reducing the amount of heat produced by such collisions. Advantageously, the tuning of the guide-field 28 also preferably minimizes the magnetic field interaction at the super-conducting leads 24. In addition, the guide-field 28 preferably is configured to channel magnetic fields away from the super conducting leads 24 (FIG. 3), which are discussed in more detail below.

Figure 2:
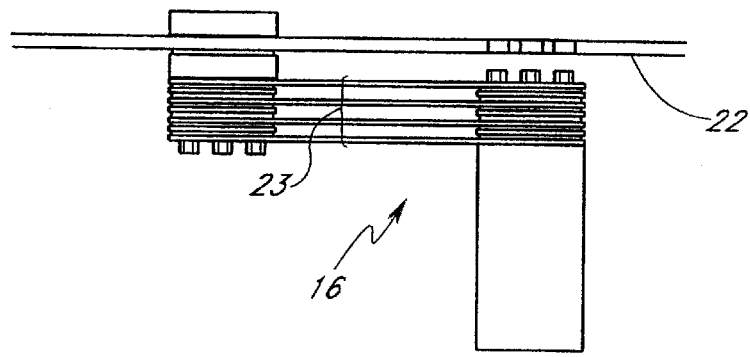
FIG. 2 is a schematic of a cold-head which provides a thermally conductive cooling contact with the cold shield and the trap core, the cold-head being similar to the cold-head shown in FIG. 1, but further including a vibration dampening mechanism, in accordance with a preferred embodiment of the present invention.

Referring to FIG. 2, the cold-heads 16 which cool the cold shield 18 and the trap core 20 are shown in greater detail. In order to effectuate the desired thermal conductivity, the cooling contacts to the cold-heads 16 are formed using a layered construction. In preferred embodiments, the contact component of the cold-head 16 is comprised of alternating layers of a rigid, thermally conductive material interspersed with layers of a malleable thermally conductive medium. The malleable thermally conductive medium preferably fills the voids between the rigid thermally conductive material, which is preferably in the form of rigid plates, thereby enabling increased heat flow between the rigid plates. More preferably, the alternating layers comprise copper as the rigid plates and indium as the malleable thermally conductive medium. In certain preferred embodiments, as shown in FIG. 2, the cold-heads 16 further include a microphonic attenuation or vibration dampening mechanism 27 which permits the dampening of mechanical vibration generated by the refrigeration system 14 through reducing the amount of vibration transmitted from the refrigeration system 14 to the cold-shield by the cold-head 16. In the shown embodiment the vibration dampening mechanism offsets the links 17 from the cold-head 16 in order further dampen vibration.

Figure 3:
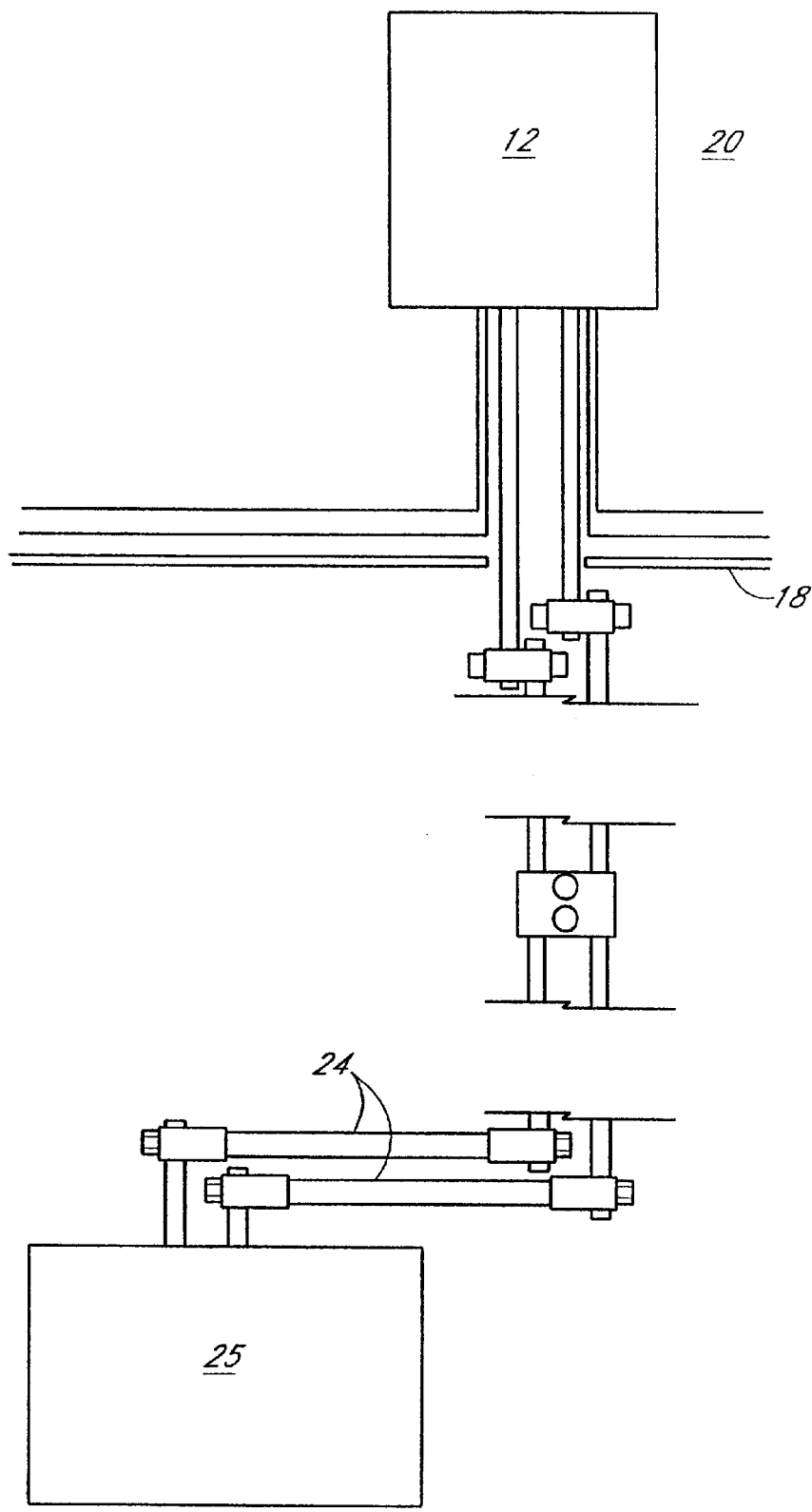
FIG. 3 is a drawing of the super-conducting lead arrangement which supplies power to the magnet in the trap core with minimized heat creation inside the cold shield, in accordance with a preferred embodiment of the present invention.

FIG. 3 shows the high-temperature, super-conducting leads 24 which supply power from a power source 25 to the super-conducting compression magnet 12 at the trap core 20, while eliminating significant heat sources from inside the cold shield 18, thereby allowing the active cooling of the trap core 20 by the external refrigeration system 14 (FIG. 1). Since the resistance of superconductors is zero, no heat emission is associated with current flow through them. In addition, because the superconducting leads 24 are designed to operate at relatively high temperature compared to the earlier generation of superconductors, the leads 24 function as superconductors at the desired operating temperature maintained inside the outer cold-shield 18 (FIG. 1), preferably around about 40° K. In preferred embodiments, the current of the super-conducting power leads at less than about 40° K ranges from 60 to 100 amperes. Preferably, the leads 24 are constructed of high temperature ceramics which are encased in epoxy. Super-conducting leads suitable for employing as leads 24 are commercially available under the trade name CryoSaver™ Leads from American Superconductor of Westborough, Mass. As the operation of ceramic super conductors can be hindered by excessive magnetic interference, in preferred embodiments employing ceramic leads, the guide-field 28 shown in FIG. 1 is employed in order to channel magnetic fields away from the leads 24. The guide-field 28 preferably reduces the magnetic saturation of the leads 24.

Preferred embodiments of the compact, liquid, gas-less, ultra-high vacuum electron beam ion trap/source are capable of producing a low energy, low divergence beam of highly charged ions (up to $Th^{80+}$), the resulting ion beam being applicable to a wide range of fields, such as material analysis and modification, among others. As previously discussed, preferred embodiments of beam device 10 function by trapping and successively ionizing neutral or low charge state ions in the space charge potential of a magnetic field compressed electron beam. Advantageously, ion beams of $10^7 Au^{69+}$ ions per second and an emittance of better than $1\pi$ mm can be produced by preferred embodiments of the present invention.

The structure and the operation of an electron beam ion trap (EBIT) are described in greater detail in D. Schneider, M. W. Clark, B. M. Penetrante, J. McDonald, J. N. Bardsley, "Production of high-charge-state thorium and uranium in an electron beam ion trap", Phys. Rev. A 44, 3119 (1991) and Schneider, D., DeWitt, D., Clark, M. W., Schuch, R., Cocke, C. L., Schmieder, R., Reed, K. J., Chen, M. H., Marrs, R. E., Levine, M., Fortner, R., "Ion collision experiments with slow, very highly charged ions extracted from an electron beam ion trap", Phys. Rev. A 42, 3889 (1990), the contents of which are incorporated by reference for the purpose of providing non-limiting examples of electron beam ion trap-source design with which preferred embodiments of the present invention provide particular utility.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications thereof. Thus, it is intended that the scope of the present invention herein disclosed should not be limited by the particular disclosed embodiments described above, but should be determined only by a fair reading of the claims that follow.

We claim:

1. An electron beam device for producing ion beams, comprising:

an electron beam source configured to produce an electron beam;

a trap core inline with the electron beam, including a compression magnet configured to compress the electron beam;

a first cooling contact in thermal communication with the trap core;

a refrigerator system configured to cool the trap core by cooling the cooling contact;

a first thermally conductive, solid link between the first cooling contact and the refrigerator system;

a collection magnet inline with the electron beam, the collection magnet located downstream of the compression magnet;

an outer cold shield substantially surrounding the electron beam source, trap core, and collection magnet;

a second cooling contact configured to cool the outer cold shield; and a second thermally conductive, solid link between the outer cold shield and the refrigerator system, wherein the first and second cooling contacts are configured to have a layered construction comprising alternating layers of a rigid, thermally conductive layer and a malleable, thermally conductive medium, the layered construction of both the first and second cooling contacts comprising alternating layers of copper and indium.

2. The electron beam device of claim 1, further comprising a vibration dampening mechanism inline with the first solid link, the vibration dampening mechanism being configured to reduce the transmission of vibrations from the refrigerator system to the trap core.

3. An electron beam device for producing ion beams comprising:

an electron beam source configured to produce an electron beam;

a trap core inline with the electron beam, including a compression magnet configured to compress the electron beam;

a first cooling contact in thermal communication with the trap core;

a refrigerator system configured to cool the trap core by cooling the cooling contact;

a first thermally conductive, solid link between the first cooling contact and the refrigerator system;

a collection magnet inline with the electron beam, the collection magnet located downstream of the compression magnet;

an outer cold shield substantially surrounding the electron beam source, trap core, and collection magnet;

an inner cold shield inside the outer cold shield and surrounding the trap core;

a vacuum vessel surrounding both the outer cold shield and the inner cold shield;

high temperature, super-conducting power leads configured to both provide power to the compression magnet and produce substantially no heat inside the outer cold shield;

a second cooling contact configured to cool the outer cold shield; and a second thermally conductive, solid link between the outer cold shield and the refrigerator system.

4. The electron beam device of claim 3, wherein the first cooling contact is configured to have a layered construction.

5. An electron beam device for producing ion beams comprising:

an electron beam source configured to produce an electron beam;

a trap core inline with the electron beam, including a compression magnet configured to compress the electron beam;

a first cooling contact in thermal communication with the trap core;

a refrigerator system configured to cool the trap core by cooling the cooling contact;

a first thermally conductive, solid link between the first cooling contact and the refrigerator system;

a collection magnet inline with the electron beam, the collection magnet located downstream of the compression magnet;

a tunable magnetic guide-field between the compression magnet and the collection magnet, the tunable magnetic guide-field being configured to act as a field-line guide that maintains shape and homogeneity of magnetic field-lines;

an outer cold shield substantially surrounding the electron beam source, trap core, and collection magnet;

high temperature, super-conducting power leads configured to both provide power to the compression magnet and produce substantially no heat inside the outer cold shield;

a second cooling contact configured to cool the outer cold shield; and a second thermally conductive, solid link between the outer cold shield and the refrigerator system.

6. The electron beam device of claim 5, wherein both the first and second cooling contacts are configured to have a layered construction.

7. The electron beam device of claim 5, wherein the magnetic guide-field is configured to reduce magnetic saturation of super-conducting power leads by channeling a magnetic field away from the power leads.

8. The electron beam device of claim 7, wherein the super-conducting power leads comprise a ceramic material.

9. The electron beam device of claim 7, wherein the current of the super-conducting power leads at less than about 40° K ranges from 60 to 100 amperes.

10. The electron beam device of claim 5, wherein the refrigerator system comprises two cryo-refrigerator units, each unit being linked to a different cooling contact, the two cryo-refrigerator units being configured to be capable of together maintaining an average temperature of about 40° K within the outer cold shield.

11. The electron beam device of claim 5, wherein the electron beam device is an electron beam ion source (EBIS).

12. The electron beam device of claim 5, wherein the electron beam device is an electron beam ion trap (EBIT).

13. An electron beam ion trap (EBIT) for producing ion beams, comprising:

an electron beam source configured to produce an electron beam;

a trap core inline with the electron beam, including a compression magnet configured to compress the electron beam, the compression magnet comprising super-conducting compression magnets together having a magnetic output of between about 2.5 Tesla and 3.5 Tesla;

a first cooling contact in thermal communication with the trap core;

a refrigerator system configured to cool the trap core by cooling the cooling contact;

a first thermally conductive, solid link between the first cooling contact and the refrigerator system;

a collection magnet inline with the electron beam, the collection magnet located downstream of the compression magnet;

an outer cold shield substantially surrounding the electron beam source, trap core, and collection magnet;

high temperature, super-conducting power leads configured to both provide power to the compression magnet and produce substantially no heat inside the outer cold shield;

a second cooling contact configured to cool the outer cold shield; and a second thermally conductive, solid link between the outer cold shield and the refrigerator system.

14. An electron beam ion trap (EBIT) for producing ion beams, comprising:
- an electron beam source configured to produce an electron beam;
- a trap core inline with the electron beam, including a compression magnet configured to compress the electron beam;
- a first cooling contact in thermal communication with the trap core;
- a refrigerator system configured to cool the trap core by cooling the cooling contact;
- a first thermally conductive, solid link between the first cooling contact and the refrigerator system;
- a collection magnet inline with the electron beam, the collection magnet located downstream of the compression magnet;
- an outer cold shield substantially surrounding the electron beam source, trap core, and collection magnet;
- high temperature, super-conducting power leads configured to both provide power to the compression magnet and produce substantially no heat inside the outer cold shield;
- a second cooling contact configured to cool the outer cold shield; and
- a second thermally conductive, solid link between the outer cold shield and the refrigerator system,
- wherein the trap is configured to be capable of ionizing ions having energy levels ranging from about 0.5 to about 40 keV.

15. The electron beam ion trap of claim 14, wherein the trap is configured to be capable of extracting and outputting ion beams having energy levels ranging from 0.5 to 40 keV multiplied by a charge of the ions extracted.

16. The electron beam ion trap of claim 14, wherein the trap is configured to be capable of producing ions with charges ranging from about $H^+$ to about $Th^{80+}$.

17. The electron beam ion trap of claim 14, wherein the trap is configured to be capable of producing ion beams of $10^7$ $Au^{69+}$ ions per second, the beams having an emittance of greater than about $1\pi$ mm.

18. A refrigeration system for cooling a trap core of an electron beam ion trap, the refrigeration system comprising:
- a cryo-refrigerator;
- a cold shield that separates a substantially room-temperature environment from a trap interior;
- a first cryo-head in solid thermal communication with the trap core, a compression magnet being located within the trap core, the first cryo-head being configured to have a layered construction comprising alternating layers of a rigid, thermally conductive material and a malleable, thermally conductive medium, the layered construction of the first cryo-head comprising alternating layers of copper and indium; and
- a first thermally conductive solid link between the first cryo-head and the cryo-refrigerator.

19. The refrigeration system of claim 18, further comprising a second cryo-head in thermal communication with the cold shield and the cryo-refrigerator through a second thermally, solid conductive link.

20. The electron beam device of claim 19, further comprising a vibration dampening mechanism inline with the first and second solid links, the vibration dampening mechanism being configured to reduce the transmission of vibrations from the cryo-refrigerator to both the trap core and the cold shield.

21. The electron beam device of claim 20, wherein at least one of the vibration dampening mechanisms is configured to reduce vibration by offsetting the cryo-head with respect to the link.

22. The refrigeration system of claim 19, wherein the refrigeration system comprises a first and second cryo-refrigerator units which together are capable of maintaining a temperature of about 40° K interior to the cold shield.

23. The electron beam device of claim 22, wherein both the first and second cryo-heads are configured to have layered construction comprising alternating layers of a rigid, thermally conductive material and a malleable, thermally conductive medium.

24. The refrigeration system of claim 19, further comprising super-conducting leads configured to provide power to the compression magnet and produce substantially no heat inside the cold shield.

25. A refrigeration system for cooling a trap core of an electron beam ion trap, the refrigeration system comprising:
- a cryo-refrigerator;
- a cold shield that separates a substantially room-temperature environment from a trap interior;
- a first cryo-head in solid thermal communication with the trap core, a compression magnet being located within the trap core;
- an electron beam collector magnet;
- a tunable magnetic guide-field between the compression magnet and the electron beam collector magnet, the tunable magnetic guide-field being configured to act as a field-line guide that maintains the shape and homogeneity of the magnetic field-lines;
- a first thermally conductive solid link between the first cryo-head and the cryo-refrigerator;
- a second cryo-head in thermal communication with the cold shield and the cryo-refrigerator through a second thermally, solid conductive link; and
- super-conducting leads configured to provide power to the compression magnet and produce substantially no heat inside the cold shield.

26. The refrigeration system of claim 25, wherein the tunable magnetic guide-field is configured to reduce the saturation of super-conducting power leads by channeling a magnetic field away from the power leads.

27. A refrigeration system for cooling a trap core of an electron beam ion trap, the refrigeration system comprising:
- a cryo-refrigerator;
- a cold shield that separates a substantially room-temperature environment from a trap interior;
- a first cryo-head in solid thermal communication with the trap core, a compression magnet being located within the trap core;
- a first thermally conductive solid link between the first cryo-head and the cryo-refrigerator; and
- a second cryo-head in thermal communication with the cold shield and the cryo-refrigerator through a second thermally, solid conductive link,
- wherein both the first and second cryo-heads are configured to have a the layered construction comprising alternating layers of copper and indium.

28. A method of cooling a trap core of an electron beam device for producing ions, comprising:
- producing an ion beam;
- compressing the electron beam in the trap core using a compression magnet;

cooling the trap core by predominantly conductively transferring heat produced in the trap core to a first cooling contact by directly cooling the compression magnet using the first cooling contact;

conducting the heat from the cooling contact through a first solid, thermally conductive link to a first cryo-refrigerator;

guiding magnetic field-lines to maintain the shape and homogeneity of the magnetic field-lines using a magnetic guide-field; and outputting a resulting ion beam.

29. The method of claim 28, wherein cooling the trap core further comprises cooling a cold shield surrounding the trap core with a second cooling contact linked by a second solid conductive link to a cryo-refrigerator, the cold shield surrounding the trap core.

30. The method of claim 28, further comprising powering the compression magnet with super-conducting power leads.

31. The method of claim 30, wherein the current of the super-conducting power leads at less than about 40° K ranges from 60 to 100 amperes.

32. The method of claim 28, wherein the electron beam device is an electron beam ion trap-source.

33. The method of claim 28, wherein the resulting beam which is extracted and outputted is an ion beam having an energy level ranging from about 0.5 to about 40 keV multiplied by a charge of the ions extracted.

34. The method of claim 28, further comprising dampening vibrations produced by the first cryo-refrigerator through employing a mechanism inline with the first solid, thermally conductive link.

* * * * *